US012718246B2

(12) United States Patent
Balaji et al.

(10) Patent No.: US 12,718,246 B2
(45) Date of Patent: Aug. 25, 2026

(54) GEOLOCATION-BASED CONSENSUS ALGORITHM FOR USE IN MONITORING PROPOSED DATA RECORDS FOR A DISTRIBUTED LEDGER

(71) Applicant: BANK OF AMERICA CORPORATION, Charlotte, NC (US)

(72) Inventors: Sujatha Balaji, Chennai (IN); Maharshi Pravinbhai Soni, Ahmedabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 83 days.

(21) Appl. No.: 18/411,790

(22) Filed: Jan. 12, 2024

(65) Prior Publication Data

US 2025/0232301 A1 Jul. 17, 2025

(51) Int. Cl.
*G06Q 20/40* (2012.01)
*G06Q 20/38* (2012.01)

(52) U.S. Cl.
CPC ....... *G06Q 20/4015* (2020.05); *G06Q 20/389* (2013.01)

(58) Field of Classification Search
CPC ............. G06Q 20/4015; G06Q 20/389; G06Q 20/407; H04L 9/50
See application file for complete search history.

(56) References Cited

U.S. PATENT DOCUMENTS

| | | | | |
|---|---|---|---|---|
| 9,473,510 | B2 * | 10/2016 | Pearce | H04W 12/08 |
| 10,158,492 | B2 * | 12/2018 | Pearce | G01S 19/215 |
| 10,419,209 | B1 | 9/2019 | Griffin | |
| 10,554,634 | B2 | 2/2020 | Bowman | |
| 10,887,112 | B2 | 1/2021 | Wu | |
| 11,057,222 | B2 | 7/2021 | Qiu | |
| 11,374,738 | B2 * | 6/2022 | Cran | H04L 9/3239 |
| 11,507,948 | B2 * | 11/2022 | DeRosa-Grund | H04L 9/3255 |
| 11,809,403 | B2 * | 11/2023 | Shpurov | G06Q 30/0226 |

(Continued)

FOREIGN PATENT DOCUMENTS

| | | | | |
|---|---|---|---|---|
| CA | 3065484 C | * 10/2025 | H04L 9/3265 |
| EP | 4096157 A1 | * 11/2022 | H04L 9/3213 |

(Continued)

*Primary Examiner* — Daniel S Felten
(74) *Attorney, Agent, or Firm* — Moore & Van Allen PLLC; Gabrielle M. Carlini

(57) ABSTRACT

In conventional distributed ledger systems, consensus mechanisms are required to maintain a common state of agreement among nodes while maintaining the distributed nature of the network. However, conventional consensus mechanisms require that the system access incoming data blocks during the consensus process, which can open the network to security threats. As such, a need exists to securely evaluate proposed data records prior to initiating a consensus mechanism. The system provided herein solves this problem by applying a geolocation engine to trace the origin of incoming data records and apply a digital signature to each data record. The distributed network model may then derive a location for each data record based on the digital signature. If the data record originated from a restricted location, the system may automatically block the addition of the data record without the need to access any other data contained within the data record.

11 Claims, 6 Drawing Sheets

(56) References Cited

U.S. PATENT DOCUMENTS 12,093,934 B2 * 9/2024 Kurian .................. H04L 9/3213
12,126,603 B2 * 10/2024 Verheyen .............. H04L 9/0833
12,141,328 B1 * 11/2024 Magerkurth .......... G06F 21/602
2016/0249176 A1 * 8/2016 Pearce .................. G01S 5/0252
2017/0041148 A1 * 2/2017 Pearce .................. H04L 63/126
2017/0046651 A1 2/2017 Lin
2017/0075941 A1 3/2017 Finlow-Bates
2017/0132615 A1 * 5/2017 Castinado ............ G06Q 20/223
2017/0140375 A1 5/2017 Kunstel
2017/0243212 A1 * 8/2017 Castinado ............ G06Q 20/389
2017/0317997 A1 * 11/2017 Smith ................... H04L 9/3247
2018/0114220 A1 4/2018 Ekberg
2018/0227293 A1 8/2018 Uhr
2019/0132295 A1 5/2019 Lenz
2019/0280870 A1 9/2019 Subramanian
2019/0357049 A1 11/2019 Tali
2020/0028688 A1 1/2020 Takada
2020/0099706 A1 * 3/2020 Righi .................. G06F 11/3013
2020/0294129 A1 9/2020 Cella
2020/0304480 A1 9/2020 Buchner
2020/0351104 A1 11/2020 Perlman
2020/0410481 A1 * 12/2020 Mayblum ............ G06Q 20/065
2021/0004923 A1 1/2021 Mackenzie
2021/0012332 A1 * 1/2021 Ow .................... G06Q 20/3678
2021/0192516 A1 * 6/2021 DeRosa-Grund ..... H04L 9/3247
2021/0281395 A1 9/2021 Narayanaswami
2021/0357914 A1 * 11/2021 Silvestri ................ H04L 9/0825
2022/0006705 A1 1/2022 Padmanabhan
2022/0210142 A1 6/2022 Sohail
2022/0270725 A1 * 8/2022 DeRosa-Grund ... G06F 16/2365
2023/0129693 A1 * 4/2023 Gadnis ............. G06Q 20/40145
705/64
2024/0104459 A1 * 3/2024 Merkel ............ G06Q 10/06313
2024/0154959 A1 * 5/2024 Mishra ................ H04L 63/0861
2024/0394708 A1 * 11/2024 Lohar .................. G06Q 30/018

FOREIGN PATENT DOCUMENTS

WO WO-2024130039 A1 * 6/2024 ......... G06Q 20/3825
WO WO-2025024385 A1 * 1/2025 ............. G06F 21/16

* cited by examiner

GEOLOCATION-BASED CONSENSUS ALGORITHM FOR USE IN MONITORING PROPOSED DATA RECORDS FOR A DISTRIBUTED LEDGER

TECHNOLOGICAL FIELD

Example embodiments of the present disclosure relate to a system and method for monitoring proposed data records for a distributed ledger.

BACKGROUND

In conventional distributed ledger systems, consensus mechanisms are required to maintain a common state of agreement among nodes while maintaining the distributed nature of the network. However, conventional consensus mechanisms require that the system access or read incoming data blocks during the consensus process, which can open the network to security threats. As such, a need exists to securely evaluate proposed data records prior to initiating a consensus mechanism.

BRIEF SUMMARY

Systems, methods, and computer program products are provided for monitoring proposed data records for a distributed ledger.

In one aspect, a system for monitoring proposed data records for a distributed ledger is presented. The system may include at least one non-transitory storage device and at least one processor coupled to the at least one non-transitory storage device, where the processing device is configured to execute computer program code comprising computer instructions configured to cause said at least one processor to perform the following operations: generate a data layer within a distributed ledger, where the data layer includes at least one code associated with a first location; receive a transaction object associated with a transaction, where the transaction object includes a digital signature; using the digital signature, derive a second location associated with the transaction object; determine that the second location associated with the transaction object matches the first location; and reject the transaction.

In some embodiments, executing the instructions further causes the processing device to update the data layer in real time based on a communication with an end-point device.

In some embodiments, the digital signature is generated by a geolocation engine in communication with a user device.

In some embodiments, the geolocation engine is configured to generate the digital signature based on a wireless signal associated with the user device.

In some embodiments, the geolocation engine is configured to generate the digital signature based on communication with a global positioning system (GPS) associated with the user device.

In some embodiments, executing the instructions further causes the processing device to, in response to determining that the second location associated with the transaction object matches the first location, transmit instructions to a quarantine node of the distributed ledger.

In some embodiments, executing the instructions further causes the processing device to designate a consensus process of the distributed ledger as failed.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
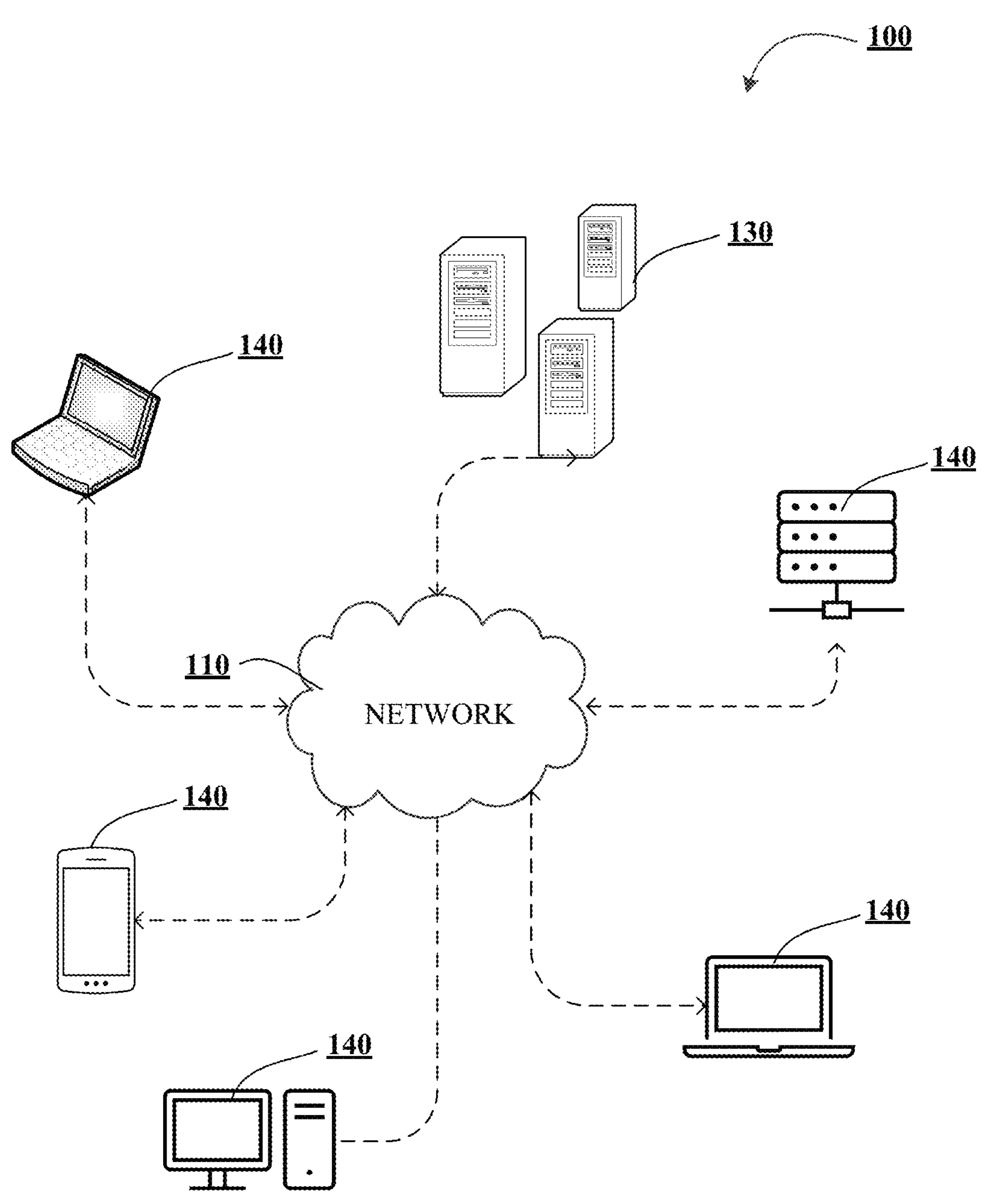
Figure 1B:
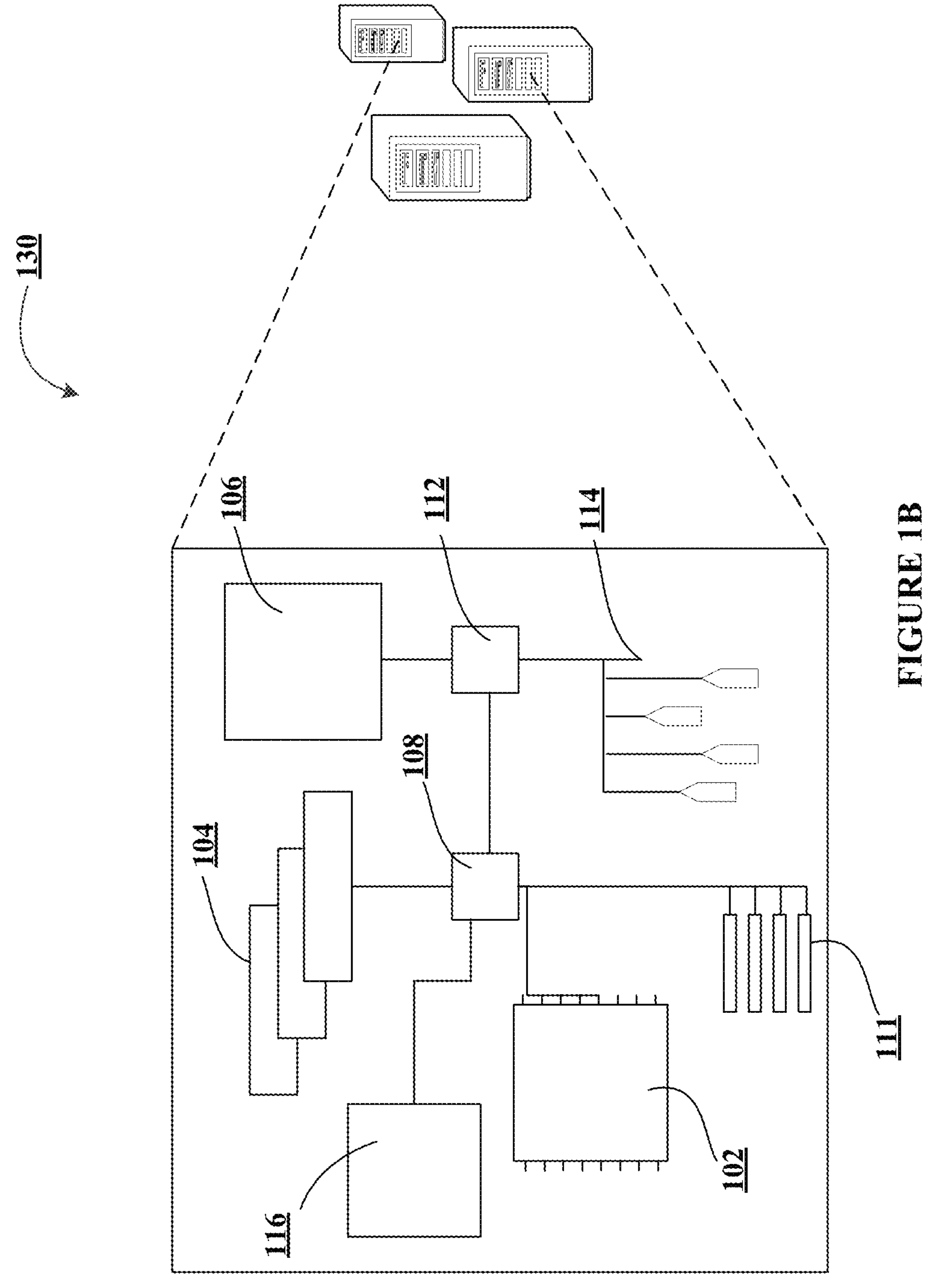
Figure 1C:
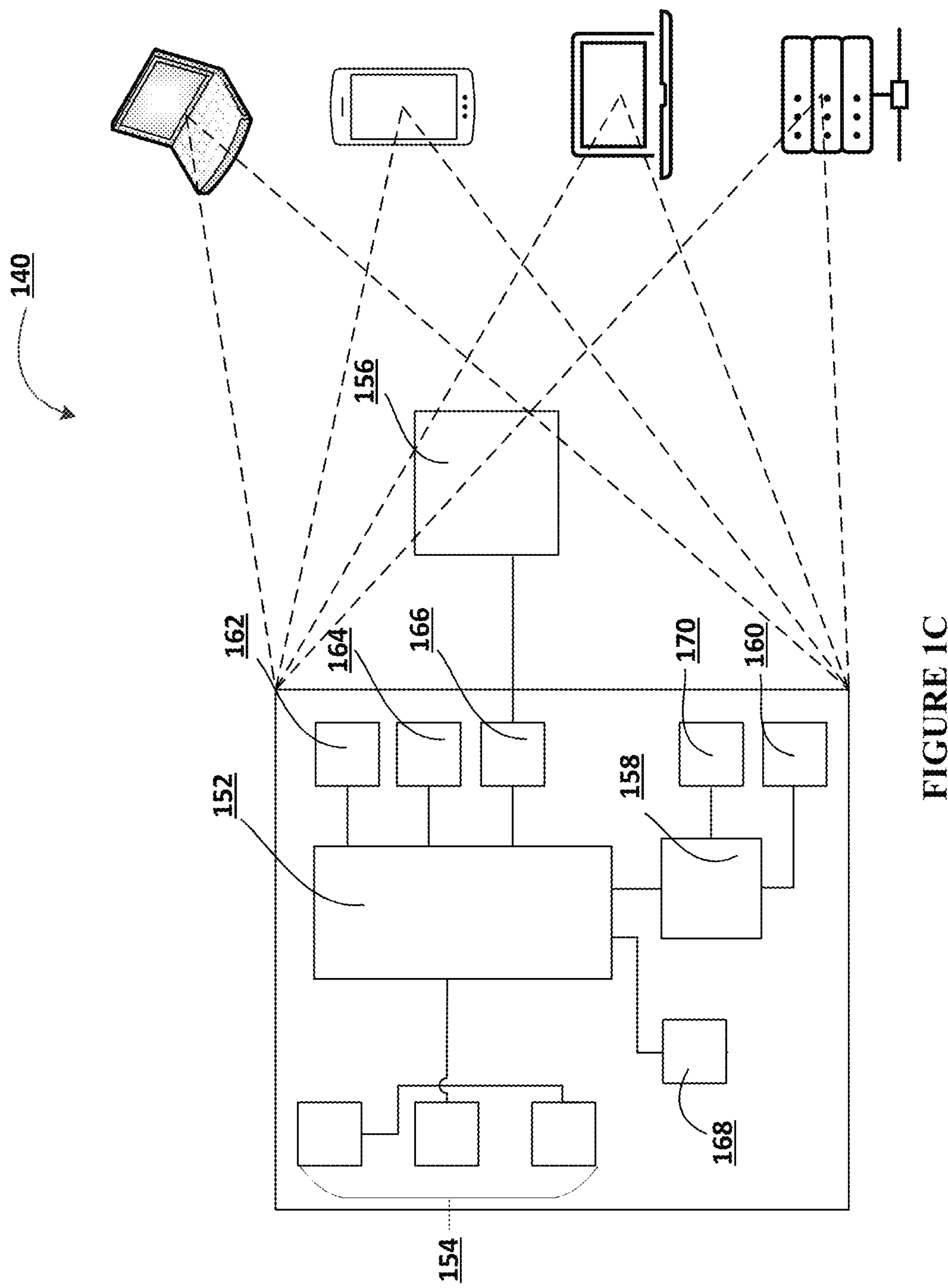
Figure 2A:
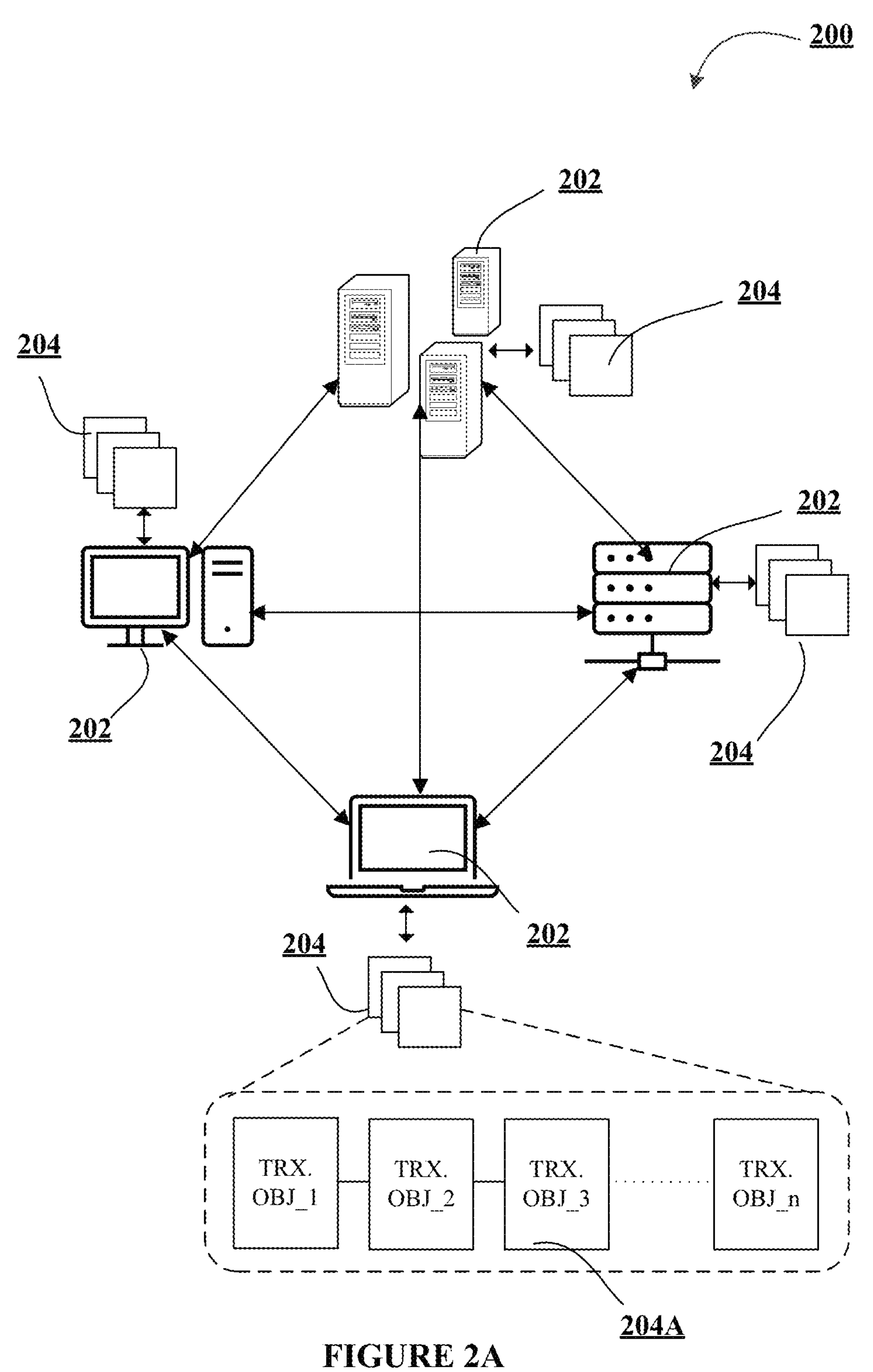
Figure 2B:
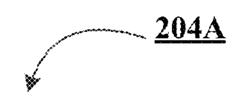
Figure 2B:
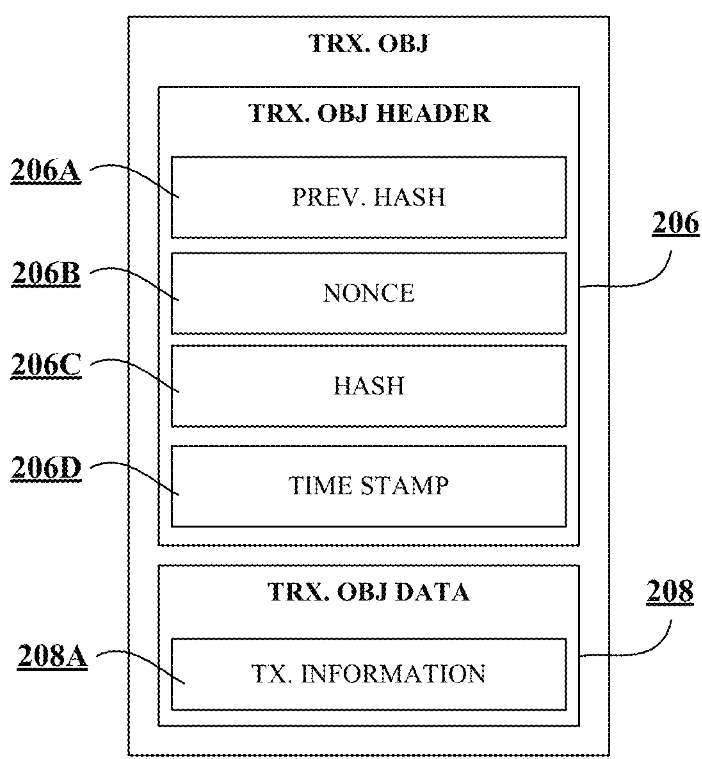
Figure 3:
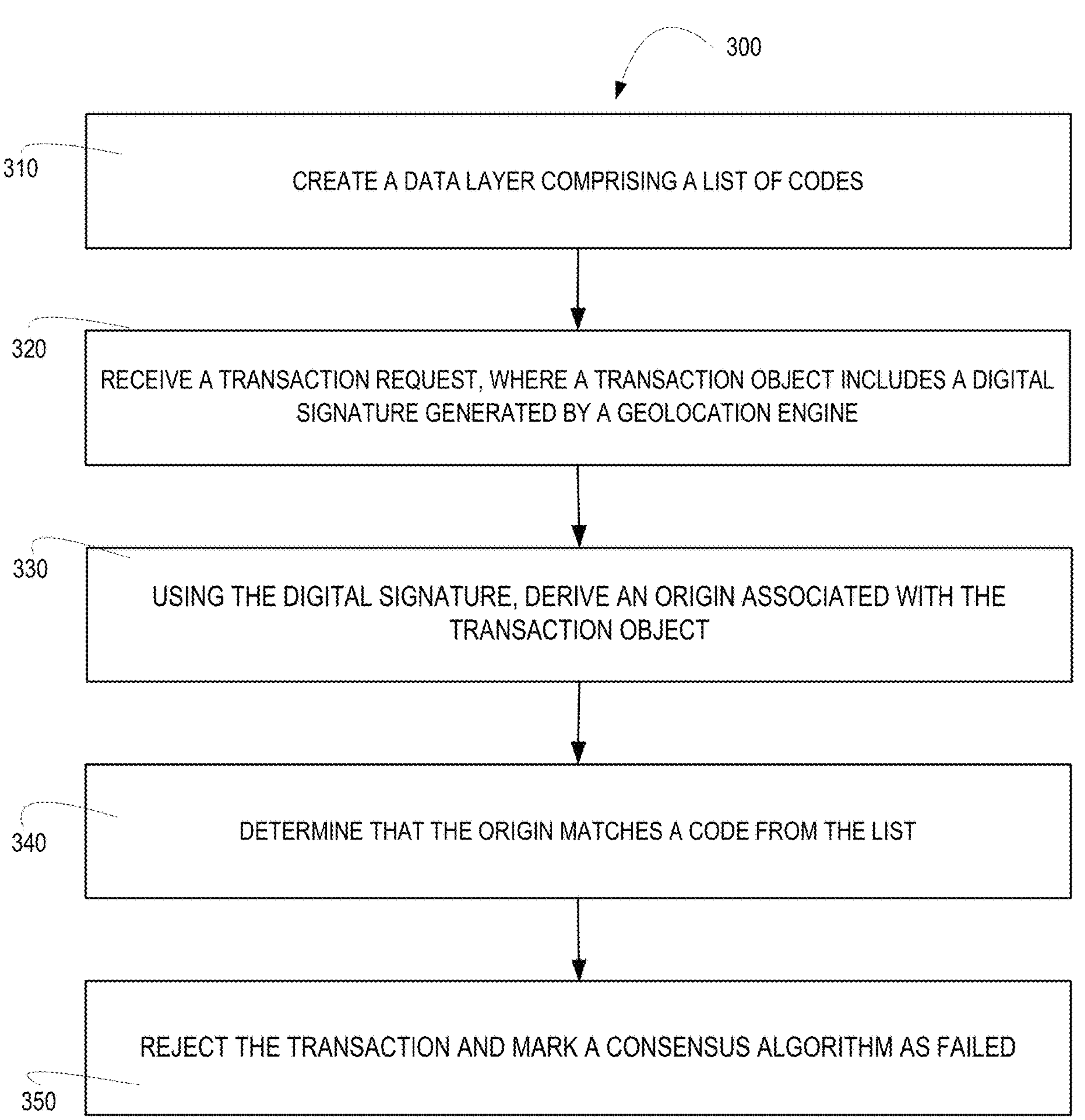

FIGS. 1A-1C illustrates technical components of an exemplary distributed computing environment for monitoring proposed data records for a distributed ledger, in accordance with an embodiment of the disclosure;

FIGS. 2A-2B illustrate an exemplary distributed ledger technology (DLT) architecture, in accordance with an embodiment of the invention; and FIG. 3 illustrates a process flow for monitoring proposed data records for a distributed ledger, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term “a” and/or “an” shall mean “one or more,” even though the phrase “one or more” is also used herein. Furthermore, when it is said herein that something is “based on” something else, it may be based on one or more other things as well. In other words, unless expressly indicated otherwise, as used herein “based on” means “based at least in part on” or “based at least partially on.” Like numbers refer to like elements throughout.

As used herein, an “entity” may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a “user” may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

In conventional distributed ledger systems, consensus mechanisms are required to maintain a common state of agreement among nodes while maintaining the distributed nature of the network. However, conventional consensus mechanisms require that the system access incoming data blocks during the consensus process, which can open the network to security threats. As such, a need exists to securely evaluate proposed data records prior to initiating a consensus mechanism. The system provided herein solves this problem by applying a geolocation engine to trace the origin of incoming data records and apply a digital signature to each data record. The distributed network model may then derive a location for each data record based on the digital signature. If the data record originated from a restricted location, the system may automatically block the addition of the data record without the need to access any other data contained within the data record.

What is more, the present disclosure provides a technical solution to a technical problem. As described herein, the technical problem includes a tradeoff between the need to maintain the decentralized nature of a distributed ledger (by using consensus mechanisms to validate transactions) with the need to preserve network security (by not accessing potentially unsafe data). The technical solution presented herein introduces a unique data layer, easily updatable in real time, in combination with a digital signature created by a geolocation engine. By comparing digital signatures to rules or other information stored within the data layer, the system can monitor potentially unsafe transactions without the need to open, read, or otherwise access the data within a potentially unsafe transaction object, thus increasing the overall security of the network.

FIGS. 1A-1C illustrate technical components of an exemplary distributed computing environment 100 for monitoring proposed data records for a distributed ledger, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIGS. 2A-2B illustrate an exemplary distributed ledger technology (DLT) architecture, in accordance with an embodiment of the invention. DLT may refer to the protocols and supporting infrastructure that allow computing devices (peers) in different locations to propose and validate transactions and update records in a synchronized way across a network. Accordingly, DLT is based on a decentralized model, in which these peers collaborate and build trust over the network. To this end, DLT involves the use of potentially peer-to-peer protocol for a cryptographically secured distributed ledger of transactions represented as transaction objects that are linked. As transaction objects each contain information about the transaction object previous to it, they are linked with each additional transaction object, reinforcing the ones before it. Therefore, distributed ledgers are resistant to modification of their data because once recorded, the data in any given transaction object cannot be altered retroactively without altering all subsequent transaction objects.

To permit transactions and agreements to be carried out among various peers without the need for a central authority or external enforcement mechanism, DLT uses smart contracts. Smart contracts are computer code that automatically executes all or parts of an agreement and is stored on a DLT platform. The code can either be the sole manifestation of the agreement between the parties or might complement a traditional text-based contract and execute certain provisions, such as transferring funds from Party A to Party B. The code itself is replicated across multiple nodes (peers) and, therefore, benefits from the security, permanence, and immutability that a distributed ledger offers. That replication also means that as each new transaction object is added to the distributed ledger, the code is, in effect, executed. If the parties have indicated, by initiating a transaction, that certain parameters have been met, the code will execute the step triggered by those parameters. If no such transaction has been initiated, the code will not take any steps.

Various other specific-purpose implementations of distributed ledgers have been developed. These include distributed domain name management, decentralized crowd-funding, synchronous/asynchronous communication, decentralized real-time ride sharing and even a general purpose deployment of decentralized applications. In some embodiments, a distributed ledger may be characterized as a public distributed ledger, a consortium distributed ledger, or a private distributed ledger. A public distributed ledger is a distributed ledger that anyone in the world can read, anyone in the world can send transactions to and expect to see them included if they are valid, and anyone in the world can participate in the consensus process for determining which transaction objects get added to the distributed ledger and what the current state each transaction object is. A public distributed ledger is generally considered to be fully decentralized. On the other hand, fully private distributed ledger is a distributed ledger whereby permissions are kept centralized with one entity. The permissions may be public or restricted to an arbitrary extent. And lastly, a consortium distributed ledger is a distributed ledger where the consensus process is controlled by a pre-selected set of nodes; for example, a distributed ledger may be associated with a number of member institutions (say 15), each of which operate in such a way that the at least 10 members must sign every transaction object in order for the transaction object to be valid. The right to read such a distributed ledger may be public or restricted to the participants. These distributed ledgers may be considered partially decentralized.

As shown in FIG. 2A, the exemplary DLT architecture 200 includes a distributed ledger 204 being maintained on multiple devices (nodes) 202 that are authorized to keep track of the distributed ledger 204. For example, these nodes 202 may be computing devices such as system 130 and client device(s) 140. One node 202 in the DLT architecture 200 may have a complete or partial copy of the entire distributed ledger 204 or set of transactions and/or transaction objects 204A on the distributed ledger 204. Transactions are initiated at a node and communicated to the various nodes in the DLT architecture. Any of the nodes can validate a transaction, record the transaction to its copy of the distributed ledger, and/or broadcast the transaction, its validation (in the form of a transaction object) and/or other data to other nodes.

As shown in FIG. 2B, an exemplary transaction object 204A may include a transaction header 206 and a transaction object data 208. The transaction header 206 may include a cryptographic hash of the previous transaction object 206A, a nonce 206B-a randomly generated 32-bit whole number when the transaction object is created, cryptographic hash of the current transaction object 206C wedded to the nonce 206B, and a time stamp 206D. The transaction object data 208 may include transaction information 208A being recorded. Once the transaction object 204A is generated, the transaction information 208A is considered signed and forever tied to its nonce 206B and hash 206C. Once generated, the transaction object 204A is then deployed on the distributed ledger 204. At this time, a distributed ledger address is generated for the transaction object 204A, i.e., an indication of where it is located on the distributed ledger 204 and captured for recording purposes. Once deployed, the transaction information 208A is considered recorded in the distributed ledger 204.

FIG. 3 illustrates a process flow 300 for monitoring proposed data records for a distributed ledger, in accordance with an embodiment of the disclosure. The process flow may begin at block 310, where the system may be configured to generate a data layer within a smart contract code for a DLT platform (i.e., a distributed ledger). The data layer may comprise a list of codes, values, and/or variables associated with one or more locations (e.g., countries, regions, geographical coordinates, and/or the like). In some embodiments, the system may be in operative communication with an end-point device, such that the end-point device may be used to dynamically alter the list of codes in the data layer in real time. For example, a user of the end-point device may be able to add or remove codes from the data layer. Additionally or alternatively, the codes in the data layer may be altered as the result of an automated computing process such as a machine learning engine.

The process flow may then continue to block 320, where the system may receive a transaction object, or digital record, associated with a new transaction on the DLT platform. In some embodiments, the transaction object may originate at a particular user device and may comprise a digital signature. The digital signature may be generated by a geolocation engine, which may be integrated within the system, integrated with the user device, hosted by a third party system, and/or any combination thereof. The geolocation engine may be configured to determine a location or origin associated with the transaction object and/or user device. In some embodiments, the geolocation may determine the origin based on communication or integration with a global positioning system (GPS) or other positioning system of the user device. Additionally or alternatively, the geolocation engine may derive the origin of the transaction object based on connection information such as signal type, signal strength, transit time, and/or the like. The geolocation engine may then generate a digital signature and append the digital signature to the transaction object. In some embodiments, the digital signature includes information related to the origin of the transaction object, as well as other data such as a timestamp or the like.

The process flow may then continue to block 330, where the system may, using the digital signature, derive the origin or location associated with the transaction object. For example, in some embodiments, the digital signature may comprise a code associated with particular geographic coordinates, countries, regions, and/or the like. The system may then apply one or more algorithms, such as machine learning algorithms, to determine the location associated with the transaction object. In some embodiments, the system may convert the information in the digital signature from one location type to another. For example, the system may convert geographic coordinates from the digital signature to a country or region based on a database.

The process flow may then continue to block 340, where the system may compare the location associated with the transaction object to the location codes in the data layer. In some embodiments, the system may determine that the location associated with the transaction object does not match any location codes in the data layer. The system may then allow the smart contract or other DLT platform code to continue with a consensus mechanism. However, additionally or alternatively, the system may determine that the location associated with the transaction object does match a location code in the data layer. In that case, the process flow may then continue to block 350, where the system may reject the transaction and/or mark the transaction as failed by designating a consensus mechanism as failed. In some embodiments, the system may transmit instructions to a quarantine node of the DLT platform in order to quarantine the transaction object and/or transaction from further access or processing.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for monitoring proposed data records for a distributed ledger, the system comprising:

a processing device;

a non-transitory storage device containing instructions when executed by the processing device, causes the processing device to perform the steps of:

generate a data layer within a smart contract code for a distributed ledger, wherein the data layer comprises a plurality of codes, wherein each code is associated with one of a plurality of locations, and wherein generating the data layer within the smart contract code for a distributed ledger further comprises updating the plurality of codes in real time based on receiving a communication from an end-point device;

receive a transaction object associated with a transaction, wherein the transaction object comprises a digital signature;

derive an origin location associated with the transaction object by identifying a geographic code within the digital signature, wherein the geographic code corresponds to the origin location;

compare the origin location associated with the transaction object to the plurality of locations associated with the plurality of codes;

determine that the origin location associated with the transaction object matches one of the plurality of locations associated with the plurality of codes;

transmit instructions to a quarantine node of distributed ledger instructing the quarantine node to quarantine the transaction;

designate a consensus process of the distributed ledger as failed; and reject the transaction.

2. The system of claim 1, wherein the digital signature is generated by a geolocation engine in communication with a user device.

3. The system of claim 2, wherein the geolocation engine is configured to generate the digital signature based on a wireless signal associated with the user device.

4. The system of claim 2, wherein the geolocation engine is configured to generate the digital signature based on communication with a global positioning system (GPS) associated with the user device.

5. A computer program product for monitoring proposed data records for a distributed ledger, the computer program product comprising a non-transitory computer-readable medium comprising code causing an apparatus to:

generate a data layer within a smart contract code for a distributed ledger, wherein the data layer comprises a plurality of codes, wherein each code is associated with one of a plurality of locations, and wherein generating the data layer within the smart contract code for a distributed ledger further comprises updating the plurality of codes in real time based on receiving a communication from an end-point device;

receive a transaction object associated with a transaction, wherein the transaction object comprises a digital signature;

derive an origin location associated with the transaction object by identifying a geographic code within the digital signature, wherein the geographic code corresponds to the origin location;

compare the origin location associated with the transaction object to the plurality of locations associated with the plurality of codes;

determine that the origin location associated with the transaction object matches one of the plurality of locations associated with the plurality of codes;

transmit instructions to a quarantine node of distributed ledger instructing the quarantine node to quarantine the transaction;

designate a consensus process of the distributed ledger as failed; and reject the transaction.

6. The computer program product of claim 5, wherein the digital signature is generated by a geolocation engine in communication with a user device.

7. The computer program product of claim 6, wherein the geolocation engine is configured to generate the digital signature based on a wireless signal associated with the user device.

8. The computer program product of claim 6, wherein the geolocation engine is configured to generate the digital signature based on communication with a global positioning system (GPS) associated with the user device.

9. A method for monitoring proposed data records for a distributed ledger, the method comprising:

generating a data layer within a smart contract code for a distributed ledger, wherein the data layer comprises a plurality of codes, wherein each code is associated with one of a plurality of locations, and wherein generating the data layer within the smart contract code for a distributed ledger further comprises updating the plurality of codes in real time based on receiving a communication from an end-point device;

receiving a transaction object associated with a transaction, wherein the transaction object comprises a digital signature;

deriving an origin location associated with the transaction object by identifying a geographic code within the digital signature, wherein the geographic code corresponds to the origin location;

comparing the origin location associated with the transaction object to the plurality of locations associated with the plurality of codes;

determining that the origin location associated with the transaction object matches one of the plurality of locations associated with the plurality of codes;

transmitting instructions to a quarantine node of distributed ledger instructing the quarantine node to quarantine the transaction;

designating a consensus process of the distributed ledger as failed; and rejecting the transaction.

10. The method of claim 9, wherein the digital signature is generated by a geolocation engine in communication with a user device and wherein the geolocation engine is configured to generate the digital signature based on a wireless signal associated with the user device.

11. The method of claim 9, wherein the digital signature is generated by a geolocation engine in communication with a user device and wherein the geolocation engine is configured to generate the digital signature based on communication with a global positioning system (GPS) associated with the user device.

* * * * *